US009065745B2

(12) United States Patent
Mukherjee et al.

(10) Patent No.: US 9,065,745 B2
(45) Date of Patent: Jun. 23, 2015

(54) NETWORK TRAFFIC DISTRIBUTION

(75) Inventors: Nilanjan Mukherjee, Santa Clara, CA (US); Dayavanti G. Karnath, Santa Clara, CA (US); Keshav Kamble, Fremont, CA (US); Dar-Ren Leu, San Jose, CA (US); Vijoy Pandey, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 81 days.

(21) Appl. No.: 13/267,459

(22) Filed: Oct. 6, 2011

(65) Prior Publication Data

US 2013/0088969 A1     Apr. 11, 2013

(51) Int. Cl.
| | |
|---|---|
| *H04L 12/26* | (2006.01) |
| *H04L 12/801* | (2013.01) |
| *H04L 12/24* | (2006.01) |
| *H04L 12/937* | (2013.01) |
| *H04L 12/803* | (2013.01) |
| *H04L 12/729* | (2013.01) |

(52) U.S. Cl.
CPC .......... *H04L 47/12* (2013.01); *H04L 43/0882* (2013.01); *H04L 43/12* (2013.01); *H04L 41/12* (2013.01); *H04L 49/254* (2013.01); *H04L 47/122* (2013.01); *H04L 45/125* (2013.01)

(58) Field of Classification Search
USPC .................. 370/229, 230, 230.1, 236, 254
See application file for complete search history.

(56) References Cited

U.S. PATENT DOCUMENTS

| | | | |
|---|---|---|---|
| 5,394,402 | A | 2/1995 | Ross |
| 5,515,359 | A | 5/1996 | Zheng |
| 5,617,421 | A | 4/1997 | Chin et al. |
| 5,633,859 | A | 5/1997 | Jain et al. |
| 5,633,861 | A | 5/1997 | Hanson et al. |
| 5,742,604 | A | 4/1998 | Edsall et al. |
| 5,893,320 | A | 4/1999 | Demaree |
| 6,147,970 | A | 11/2000 | Troxel |
| 6,304,901 | B1 | 10/2001 | McCloghrie et al. |
| 6,347,337 | B1 | 2/2002 | Shah et al. |
| 6,567,403 | B1 | 5/2003 | Congdon et al. |

(Continued)

FOREIGN PATENT DOCUMENTS

| | | |
|---|---|---|
| CN | 1897567 | 1/2007 |
| CN | 101030959 A | 9/2007 |

(Continued)

OTHER PUBLICATIONS

U.S. Appl. No. 13/107,433 Notice of Allowance dated Mar. 14, 2014.

(Continued)

*Primary Examiner* — Brian O'Connor
(74) *Attorney, Agent, or Firm* — Russell Ng PLLC; Matthew Baca

(57) ABSTRACT

A switch for a switching network includes a plurality of ports for communicating data traffic and a switch controller that controls switching between the plurality of ports. The switch controller selects a forwarding path for the data traffic based on at least topological congestion information for the switching network. In a preferred embodiment, the topological congestion information includes sFlow topological congestion information and the switch controller includes an sFlow client that receives the sFlow topological congestion information from an sFlow controller in the switching network.

12 Claims, 6 Drawing Sheets

(56) References Cited

U.S. PATENT DOCUMENTS

| | | | |
|---|---|---|---|
| 6,646,985 B1 | 11/2003 | Park et al. | |
| 6,839,768 B2 | 1/2005 | Ma et al. | |
| 6,901,452 B1 | 5/2005 | Bertagna | |
| 6,992,984 B1 | 1/2006 | Gu | |
| 7,035,220 B1 | 4/2006 | Simcoe | |
| 7,173,934 B2 | 2/2007 | Lapuh et al. | |
| 7,263,060 B1 | 8/2007 | Garofalo et al. | |
| 7,269,157 B2 * | 9/2007 | Klinker et al. | 370/351 |
| 7,483,370 B1 | 1/2009 | Dayal et al. | |
| 7,508,763 B2 | 3/2009 | Lee | |
| 7,561,517 B2 * | 7/2009 | Klinker et al. | 370/235 |
| 7,593,320 B1 | 9/2009 | Cohen et al. | |
| 7,606,160 B2 * | 10/2009 | Klinker et al. | 370/238 |
| 7,633,944 B1 * | 12/2009 | Chang et al. | 370/392 |
| 7,668,966 B2 * | 2/2010 | Klinker et al. | 709/232 |
| 7,830,793 B2 | 11/2010 | Gai et al. | |
| 7,839,777 B2 | 11/2010 | DeCusatis et al. | |
| 7,848,226 B2 | 12/2010 | Morita | |
| 7,912,003 B2 | 3/2011 | Radunovic et al. | |
| 7,974,223 B2 | 7/2011 | Zelig et al. | |
| 8,085,657 B2 | 12/2011 | Legg | |
| 8,139,358 B2 | 3/2012 | Tambe | |
| 8,194,534 B2 | 6/2012 | Pandey et al. | |
| 8,204,061 B1 | 6/2012 | Sane et al. | |
| 8,213,429 B2 | 7/2012 | Wray et al. | |
| 8,218,447 B2 * | 7/2012 | Rajan et al. | 370/238 |
| 8,260,922 B1 * | 9/2012 | Aggarwal et al. | 709/226 |
| 8,265,075 B2 | 9/2012 | Pandey | |
| 8,271,680 B2 | 9/2012 | Salkewicz | |
| 8,325,598 B2 | 12/2012 | Krzanowski | |
| 8,345,697 B2 | 1/2013 | Kotha et al. | |
| 8,400,915 B1 | 3/2013 | Brown et al. | |
| 8,406,128 B1 * | 3/2013 | Brar et al. | 370/229 |
| 8,498,284 B2 | 7/2013 | Pani et al. | |
| 8,498,299 B2 | 7/2013 | Katz et al. | |
| 8,504,686 B2 * | 8/2013 | Phaal | 709/224 |
| 8,625,427 B1 | 1/2014 | Terry et al. | |
| 8,750,129 B2 | 6/2014 | Kamath et al. | |
| 8,767,529 B2 | 7/2014 | Kamath et al. | |
| 8,767,722 B2 | 7/2014 | Kamble et al. | |
| 8,793,685 B2 | 7/2014 | Kidambi et al. | |
| 8,793,687 B2 | 7/2014 | Kidambi et al. | |
| 8,797,843 B2 | 8/2014 | Kamath et al. | |
| 8,824,485 B2 | 9/2014 | Biswas et al. | |
| 8,837,499 B2 | 9/2014 | Leu et al. | |
| 2001/0043564 A1 | 11/2001 | Bloch et al. | |
| 2002/0191628 A1 | 12/2002 | Liu et al. | |
| 2003/0185206 A1 | 10/2003 | Jayakrishnan | |
| 2004/0031030 A1 | 2/2004 | Kidder et al. | |
| 2004/0088451 A1 | 5/2004 | Han | |
| 2004/0243663 A1 | 12/2004 | Johanson et al. | |
| 2004/0255288 A1 | 12/2004 | Hashimoto et al. | |
| 2005/0047334 A1 | 3/2005 | Paul et al. | |
| 2005/0047405 A1 | 3/2005 | Denzel et al. | |
| 2006/0029072 A1 | 2/2006 | Perera et al. | |
| 2006/0092842 A1 | 5/2006 | Beukema et al. | |
| 2006/0153078 A1 | 7/2006 | Yasui | |
| 2006/0251067 A1 | 11/2006 | DeSanti et al. | |
| 2007/0036178 A1 | 2/2007 | Hares et al. | |
| 2007/0157200 A1 | 7/2007 | Hopkins | |
| 2007/0263640 A1 | 11/2007 | Finn | |
| 2008/0205377 A1 | 8/2008 | Chao et al. | |
| 2008/0225712 A1 * | 9/2008 | Lange | 370/230.1 |
| 2008/0228897 A1 | 9/2008 | Ko | |
| 2009/0037927 A1 | 2/2009 | Sangili et al. | |
| 2009/0129385 A1 | 5/2009 | Wray et al. | |
| 2009/0185571 A1 | 7/2009 | Tallet | |
| 2009/0213869 A1 | 8/2009 | Rajendran et al. | |
| 2009/0252038 A1 | 10/2009 | Cafiero et al. | |
| 2010/0054129 A1 | 3/2010 | Kuik et al. | |
| 2010/0054260 A1 | 3/2010 | Pandey et al. | |
| 2010/0097926 A1 | 4/2010 | Huang et al. | |
| 2010/0158024 A1 | 6/2010 | Sajassi et al. | |
| 2010/0183011 A1 | 7/2010 | Chao | |
| 2010/0223397 A1 | 9/2010 | Elzur | |
| 2010/0226368 A1 | 9/2010 | Mack-Crane et al. | |
| 2010/0242043 A1 | 9/2010 | Shorb | |
| 2010/0246388 A1 | 9/2010 | Gupta et al. | |
| 2010/0257263 A1 | 10/2010 | Casado et al. | |
| 2010/0265824 A1 | 10/2010 | Chao et al. | |
| 2010/0303075 A1 | 12/2010 | Tripathi et al. | |
| 2011/0007746 A1 | 1/2011 | Mudigonda et al. | |
| 2011/0019678 A1 | 1/2011 | Mehta et al. | |
| 2011/0026403 A1 | 2/2011 | Shao et al. | |
| 2011/0026527 A1 | 2/2011 | Shao et al. | |
| 2011/0032944 A1 | 2/2011 | Elzur et al. | |
| 2011/0035494 A1 | 2/2011 | Pandey et al. | |
| 2011/0103389 A1 | 5/2011 | Kidambi et al. | |
| 2011/0134793 A1 | 6/2011 | Elsen et al. | |
| 2011/0235523 A1 | 9/2011 | Jha et al. | |
| 2011/0280572 A1 | 11/2011 | Vobbilisetty et al. | |
| 2011/0299406 A1 | 12/2011 | Vobbilisetty et al. | |
| 2011/0299409 A1 | 12/2011 | Vobbilisetty et al. | |
| 2011/0299532 A1 | 12/2011 | Yu et al. | |
| 2011/0299533 A1 | 12/2011 | Yu et al. | |
| 2011/0299536 A1 | 12/2011 | Cheng et al. | |
| 2012/0014261 A1 | 1/2012 | Salam et al. | |
| 2012/0014387 A1 | 1/2012 | Dunbar et al. | |
| 2012/0016970 A1 | 1/2012 | Shah et al. | |
| 2012/0027017 A1 | 2/2012 | Rai et al. | |
| 2012/0033541 A1 | 2/2012 | Jacob Da Silva et al. | |
| 2012/0117228 A1 | 5/2012 | Gabriel et al. | |
| 2012/0131662 A1 | 5/2012 | Kuik et al. | |
| 2012/0163164 A1 | 6/2012 | Terry et al. | |
| 2012/0177045 A1 | 7/2012 | Berman | |
| 2012/0226866 A1 | 9/2012 | Bozek et al. | |
| 2012/0228780 A1 | 9/2012 | Kim et al. | |
| 2012/0243539 A1 | 9/2012 | Keesara | |
| 2012/0243544 A1 | 9/2012 | Keesara | |
| 2012/0287786 A1 | 11/2012 | Kamble et al. | |
| 2012/0287787 A1 | 11/2012 | Kamble et al. | |
| 2012/0287939 A1 | 11/2012 | Leu et al. | |
| 2012/0320749 A1 | 12/2012 | Kamble et al. | |
| 2013/0022050 A1 | 1/2013 | Leu et al. | |
| 2013/0051235 A1 | 2/2013 | Song et al. | |
| 2013/0064067 A1 | 3/2013 | Kamath et al. | |
| 2013/0064068 A1 | 3/2013 | Kamath et al. | |

FOREIGN PATENT DOCUMENTS

| | | |
|---|---|---|
| CN | 101087238 | 12/2007 |
| EP | 0853405 | 7/1998 |

OTHER PUBLICATIONS

U.S. Appl. No. 13/466,790 Notice of Allowance dated Mar. 17, 2014.
U.S. Appl. No. 13/595,405 Notice of Allowance dated Mar. 20, 2014.
U.S. Appl. No. 13/594,970 Notice of Allowance dated Mar. 25, 2014.
U.S. Appl. No. 13/655,631; Non-final office action dated Mar. 25, 2014.
UK Intellectual Property Office; Great Britain Appln. GB1320969.7; Examination Report dated Jan. 28, 2014 (4 pg).
U.S. Appl. No. 13/107,554, Notice of Allowance Dated Oct. 18, 2013.
U.S. Appl. No. 13/267,459, Final Office Action Dated Oct. 23, 2013.
U.S. Appl. No. 13/107,894, Final Office Action Dated Nov. 1, 2013.
U.S. Appl. No. 13/594,993, Non-Final Office Action Dated Oct. 25, 2013.
U.S. Appl. No. 13/595,405, Final Office Action Dated Nov. 19, 2013.
U.S. Appl. No. 13/229,891, Final Office Action Dated Nov. 21, 2013.
U.S. Appl. No. 13/621,219, Non-Final Office Action Dated Nov. 26, 2013.
U.S. Appl. No. 13/594,970, Final Office Action Dated Dec. 4, 2013.
U.S. Appl. No. 13/595,047, Notice of Allowance Dated Dec. 23, 2013.
U.S. Appl. No. 13/229,867, Notice of Allowance Dated Dec. 30, 2013.
U.S. Appl. No. 13/107,894, Notice of Allowance Dated Jan. 10, 2014.
U.S. Appl. No. 13/267,578, Notice of Allowance Dated Jan. 24, 2014.
U.S. Appl. No. 13/107,894, Notice of Allowance Dated Feb. 19, 2014.
U.S. Appl. No. 13/594,993, Notice of Allwance Dated Feb. 19, 2014.

(56) References Cited

OTHER PUBLICATIONS

U.S. Appl. No. 13/229,891, Notice of Allowance Dated Feb. 19, 2014.
U.S. Appl. No. 13/655,975, Notice of Allowance Dated Feb. 19, 2014.
U.S. Appl. No. 13/780,530, Non-Final Office Action Dated Feb. 20, 2014.
U.S. Appl. No. 13/315,443, Non-Final Office Action Dated Feb. 20, 2014.
U.S. Appl. No. 13/107,894, Non-Final Office action Dated Jun. 20, 2013.
U.S. Appl. No. 13/594,970, Non-Final Office Action Dated Sep. 25, 2013.
U.S. Appl. No. 13/594,970, Non-Final Office Action Dated May 29, 2013.
U.S. Appl. No. 13/107,397, Final Office Action Dated May 29, 2013.
U.S. Appl. No. 13/107,397, Non-Final Office Action Dated Jan. 4, 2013.
U.S. Appl. No. 13/466,754, Non-Final Office Action Dated Sep. 25, 2013.
U.S. Appl. No. 13/229,867, Non-Final Office Action Dated May 24, 2013.
U.S. Appl. No. 13/595,047, Non-Final Office Action Dated May 24, 2013.
U.S. Appl. No. 13/107,985, Notice of Allowance Dated Jul. 18, 2013.
U.S. Appl. No. 13/107985, Non-Final Office Action Dated Feb. 28, 2013.
U.S. Appl. No. 13/107,433, Final Office Action Dated Jul. 10, 2013.
U.S. Appl. No. 13/107,433, Non-Final Office Action Dated Jan. 28, 2013.
U.S. Appl. No. 13/466,790, Final Office Action Dated Jul. 12, 2013.
U.S. Appl. No. 13/466,790, Non-Final Office Action Dated Feb. 15, 2013.
U.S. Appl. No. 13/107,554, Final Office Action Dated Jul. 3, 2013.
U.S. Appl. No. 13/107,554, Non-Final Office Action Dated Jan. 8, 2013.
U.S. Appl. No. 13/229,891, Non-Final Office Action Dated May 9, 2013.
U.S. Appl. No. 13/595,405, Non-Final Office Action Dated May 9, 2013.
U.S. Appl. No. 13/107,896, Notice of Allowance Dated Jul. 29, 2013.
U.S. Appl. No. 13/107,896, Non-Final Office Action Dated Mar. 7, 2013.
U.S. Appl. No. 13/267,459, Non-Final Office Action Dated May 2, 2013.
U.S. Appl. No. 13/267,578, Non-Final Office Action Dated Aug. 6, 2013.
U.S. Appl. No. 13/267,578, Non-Final Office Action Dated Apr. 5, 2013.
U.S. Appl. No. 13/314,455, Final Office Action Dated Aug. 30, 2013.
U.S. Appl. No. 13/314,455, Non-Final Office Action Dated Apr. 24, 2013.
Martin, et al., "Accuracy and Dynamics of Multi-Stage Load Balancing for Multipath Internet Routing", Institute of Computer Science, Univ. of Wurzburg Am Hubland, Germany, IEEE Int'l Conference on Communications (ICC) Glasgow, UK, pp. 1-8, Jun. 2007.
Kinds, et al., "Advanced Network Monitoring Brings Life to the Awareness Plane", IBM Research Spyros Denazis, Univ. of Patras Benoit Claise, Cisco Systems, IEEE Communications Magazine, pp. 1-7, Oct. 2008.
Kandula, et al., "Dynamic Load Balancing Without Packet Reordering", ACM SIGCOMM Computer Communication Review, vol. 37, No. 2, pp. 53-62, Apr. 2007.
Vazhkudai, et al., "Enabling the Co-Allocation of Grid Data Transfers", Department of Computer and Information Sciences, The Univ. of Mississippi, pp. 44-51, Nov. 17, 2003.
Xiao, et al. "Internet QoS: A Big Picture", Michigan State University, IEEE Network, pp. 8-18, Mar./Apr. 1999.
Jo et al., "Internet Traffic Load Balancing using Dynamic Hashing with Flow Volume", Conference Title: Internet Performance and Control of Network Systems III, Boston, MA pp. 1-12, Jul. 30, 2002.
Schueler et al., "TCP-Splitter: A TCP/IP Flow Monitor in Reconfigurable Hardware", Appl. Res. Lab., Washington Univ. pp. 54-59, Feb. 19, 2003.
Yemini et al., "Towards Programmable Networks"; Dept. of Computer Science Columbia University, pp. 1-11, Apr. 15, 1996.
Soule, et al., "Traffic Matrices: Balancing Measurements, Interference and Modeling", vol. 33, Issue: 1, Publisher: ACM, pp. 362-373, Year 2005.
De-Leon, "Flow Control for Gigabit", Digital Equipment Corporation (Digital), IEEE 802.3z Task Force, Jul. 9, 1996.
Schlansker, et al., "High-Performance Ethernet-Based Communications for Future Multi-Core Processors", Proceedings of the 2007 ACM/IEEE conference on Supercomputing, Nov. 10-16, 2007.
Yoshigoe, et al., "Rate Control for Bandwidth Allocated Services in IEEE 802.3 Ethernet", Proceedings of the 26th Annual IEEE Conference on Local Computer Networks, Nov. 14-16, 2001.
Tolmie, "HIPPI-6400—Designing for speed", 12th Annual Int'l Symposium on High Performance Computing Systems and Applications (HPCSt98), May 20-22, 1998.
Manral, et al., "Rbridges: Bidirectional Forwarding Detection (BFD) support for Trill draft-manral-trill-bfd-encaps-01", pp. 1-10, TRILL Working Group Internet-Draft, Mar. 13, 2011.
Perlman, et al., "Rbridges: Base Protocol Specification", pp. 1-117, TRILL Working Group Internet-Draft, Mar. 3, 2010.
D.E. Eastlake, "Rbridges and the IETF TRILL Protocol", pp. 1-39, TRILL Protocol, Dec. 2009.
Leu, Dar-Ren, "dLAG-DMLT over TRILL", Blade Network Technologies, pp. 1-20, Copyright 2009.
Posted by Mike Fratto, "Cisco's FabricPath and IETF TRILL: Cisco Can't Have Standards Both Ways", Dec. 17, 2010; http://www.networkcomputing.com/data-networking-management/229500205.
CISCO Systems Inc., "Cisco FabricPath Overview", pp. 1-20, Copyright 2009.
Brocade, "BCEFE in a Nutshell First Edition", Global Education Services Rev. 0111, pp. 1-70, Copyright 2011, Brocade Communications Systems, Inc.
Pettit et al., Virtual Switching in an Era of Advanced Edges, pp. 1-7, Nicira Networks, Palo Alto, California. Version date Jul. 2010.
Pfaff et al., Extending Networking into the Virtualization Layer, pp. 1-6, Oct. 2009, Proceedings of the 8th ACM Workshop on Hot Topics in Networks (HotNets—VIII), New York City, New York.
Sherwood et al., FlowVisor: A Network Virtualization Layer, pp. 1-14, Oct. 14, 2009, Deutsche Telekom Inc. R&D Lab, Stanford University, Nicira Networks.
Yan et al., Tesseract: A 4D Network Control Plane, pp. 1-15, NSDI'07 Proceedings the 4th USENIX conference on Networked systems design & implementation USENIX Association Berkeley, CA, USA 2007.
Hunter et al., BladeCenter, IBM Journal of Research and Development, vol. 49, No. 6, p. 905. Nov. 2005.
VMware, Inc., "VMware Virtual Networking Concepts", pp. 1-12, Latest Revision: Jul. 29, 2007.
Perla, "Profiling User Activities on Guest OSes in a Virtual Machine Environment." (2008).
Shi et al., Architectural Support for High Speed Protection of Memory Integrity and Confidentiality in Multiprocessor Systems, pp. 1-12, Proceedings of the 13th International Conference on Parallel Architecture and Compilation Techniques (2004).
Guha et al., ShutUp: End-to-End Containment of Unwanted Traffic, pp. 1-14, (2008).
Recio et al., Automated Ethernet Virtual Bridging, pp. 1-11, IBM 2009.
Sproull et al., "Control and Configuration Software for a Reconfigurable Networking Hardware Platform", Applied Research Laboratory, Washington University, Saint Louis, MO 63130; pp. 1-10 (or 45-54)—Issue Date: 2002, Date of Current Version: Jan. 6, 2003.
Papadopoulos et al.,"NPACI Rocks: Tools and Techniques for Easily Deploying Manageable Linux Clusters", The San Diego

(56) References Cited

OTHER PUBLICATIONS

Supercomputer Center, University of California San Diego, La Jolla, CA 92093-0505—Issue Date: 2001, Date of Current Version: Aug. 7, 2002.
Ruth et al., Virtual Distributed Environments in a Shared Infrastructure, pp. 63-69, IEEE Computer Society, May 2005.
Rouiller, Virtual LAN Security: weaknesses and countermeasures, pp. 1-49, GIAC Security Essentials Practical Assignment Version 1.4b" (2006).
Walters et al., An Adaptive Heterogeneous Software DSM, pp. 1-8, Columbus, Ohio, Aug. 14-18.
Skyrme et al., Exploring Lua for Concurrent Programming, pp. 3556-3572, Journal of Universal Computer Science, vol. 14, No. 21 (2008), submitted: Apr. 16, 2008, accepted: Jun. 5, 2008, appeared: Dec. 1, 2008.
Dobre, Multi-Architecture Operating Systems, pp. 1-82, Oct. 4, 2004.
Int'l Searching Authority; Int. Appln. PCT/IB2012/051803; Int'l Search Report dated Sep. 13, 2012 (7 pg.).
U.S. Appl. No. 13/107,893, Notice of Allowance Dated Jul. 10, 2013.
U.S. Appl. No. 13/107,893, Non-Final Office Action Dated Apr. 1, 2013.
U.S. Appl. No. 13/472,964, Notice of Allowance Dated Jul. 12, 2013.
U.S. Appl. No. 13/472,964, Non-Final Office Action Dated Mar. 29, 2013.
U.S. Appl. No. 13/107,903, Notice of Allowance Dated Sep. 11, 2013.
U.S. Appl. No. 13/107,903, Final Office Action Dated Jul. 19, 2013.
U.S. Appl. No. 13/107,903, Non-Final Office Action Dated Feb. 22, 2013.
U.S. Appl. No. 13/585,446, Notice of Allowance Dated Sep. 12, 2013.
U.S. Appl. No. 13/585,446, Final Office Action Dated Jul. 19, 2013.
U.S. Appl. No. 13/585,446, Non-Final Office Action Dated Feb. 16, 2013.
U.S. Appl. No. 13/315,443 entitled "Fault Tolerant Communication in a TRILL Network"; Notice of Allowance dated Sep. 25, 2014 (13 pg).
U.S. Appl. No. 13/780,530 entitled "Fault Tolerant Communication in a TRILL Network"; Notice of Allowance dated Sep. 25, 2014 (9 pg).
U.S. Appl. No. 13/655,631 entitled "Credit-Based Network Congestion Management"; Notice of Allowance dated Sep. 17, 2014 (16 pg).

* cited by examiner

NETWORK TRAFFIC DISTRIBUTION

BACKGROUND OF THE INVENTION

1. Technical Field

The present disclosure relates in general to network communication and, in particular, to traffic distribution in packet switched networks.

2. Description of the Related Art

As is known in the art, network communication is commonly premised on the well known seven layer Open Systems Interconnection (OSI) model, which defines the functions of various protocol layers while not specifying the layer protocols themselves. The seven layers, sometimes referred to herein as Layer 7 through Layer 1, are the application, presentation, session, transport, network, data link, and physical layers, respectively.

At a source station, data communication begins when data is received from a source process at the top (application) layer of the stack of functions. The data is sequentially formatted at each successively lower layer of the stack until a data frame of bits is obtained at the data link layer. Finally, at the physical layer, the data is transmitted in the form of electromagnetic signals toward a destination station via a network link. When received at the destination station, the transmitted data is passed up a corresponding stack of functions in the reverse order in which the data was processed at the source station, thus supplying the information to a receiving process at the destination station.

The principle of layered protocols, such as those supported by the OSI model, is that, while data traverses the model layers vertically, the layers at the source and destination stations interact in a peer-to-peer Layer N to Layer N) manner, and the functions of each individual layer are performed without affecting the interface between the function of the individual layer and the protocol layers immediately above and below it, To achieve this effect, each layer of the protocol stack in the source station typically adds information (in the form of an encapsulated header) to the data generated by the sending process as the data descends the stack. At the destination station, these encapsulated headers are stripped off one-by-one as the data propagates up the layers of the stack until the decapsulated data is delivered to the receiving process.

The physical network coupling the source and destination stations may include any number of network nodes interconnected by one or more wired or wireless network links. The network nodes commonly include hosts (e.g., server computers, client computers, mobile devices, etc.) that produce and consume network traffic, switches, and routers. Conventional network switches interconnect different network segments and process and forward data at the data link layer (Layer 2) of the OSI model. Switches typically provide at least basic bridge functions, including filtering data traffic by Layer 2 Media Access Control (MAC) address, learning the source MAC addresses of frames, and forwarding frames based upon destination MAC addresses. Routers, which interconnect different networks at the network (Layer 3) of the OSI model, typically implement network services such as route processing, path determination and path switching.

A large network typically includes a large number of switches, which operate somewhat independently. Switches within the flow path of network data traffic include an ingress switch that receives incoming data packets and an egress switch that sends outgoing data packets, and frequently further include one or more intermediate switches coupled between the ingress and egress switches, in such a network, a switch is said to be congested when the rate at which data traffic ingresses at the switch exceeds the rate at which data traffic egresses at the switch.

In conventional networks, when a switch in a data flow path is congested with data traffic, the congested switch may apply "back pressure" by transmitting one or more congestion management messages, such as a priority-based flow control (PFC) or congestion notification (CN) message, requesting other switches in the network that are transmitting data traffic to the congested switch to reduce or to halt data traffic to the congested switch. Conventional congestion management message may specify a backoff time period during which data traffic is reduced or halted, where the backoff time may be determined upon the extent of congestion experienced by the congested switch. Conventional congestion management messages may not provide satisfactory management of network traffic, however. While serving to temporarily reduce the transmission rate of some network nodes, conventional congestion management does nothing to address persistent long term congestion on switching ports, which can arise, for example, in cases in which different high-traffic source-destination address tuples hash to the same network path.

SUMMARY OF THE INVENTION

In at least one embodiment, a switch for a switching network includes a plurality of ports for communicating data traffic and a switch controller that controls switching between the plurality of ports. The switch controller selects a forwarding path for the data traffic based on at least topological congestion information for the switching network. In a preferred embodiment, the topological congestion information includes sFlow topological congestion information and the switch controller includes an sFlow client that receives the sFlow topological congestion information from an sFlow controller in the switching network.

DETAILED DESCRIPTION OF ILLUSTRATIVE EMBODIMENT

Figure 1:
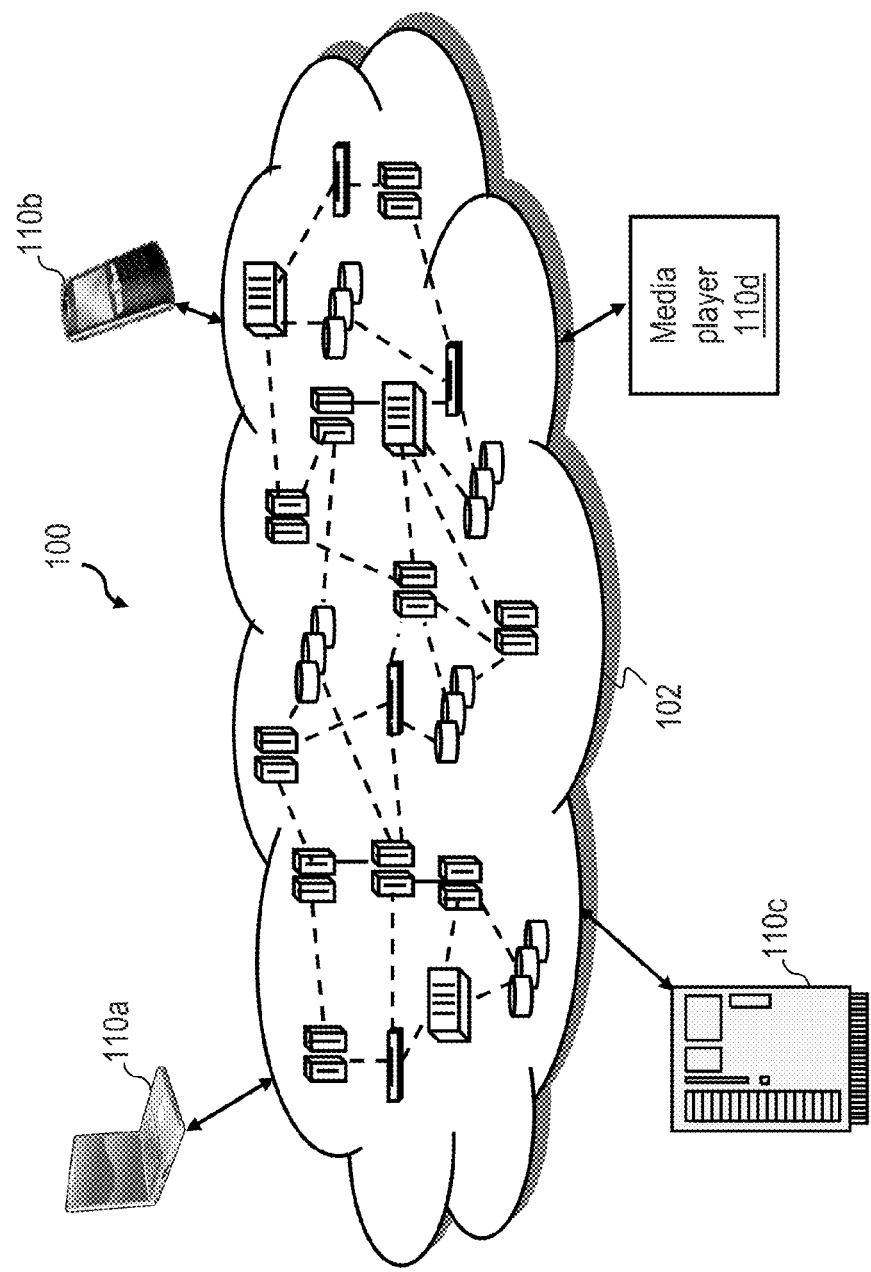
FIG. 1 is a high level block diagram of a data processing environment in accordance with one embodiment.

With reference now to the figures and with particular reference to FIG. 1, there is illustrated a high level block diagram of an exemplary data processing environment 100 in accordance within one embodiment. As shown, data processing environment 100 includes a collection of resources 102. Resources 102, which may include various hosts, clients, switches, routers, storage, etc., are interconnected for communication and may be grouped (not shown) physically or virtually, in one or more public, private, community, public, or cloud networks or a combination thereof. In this manner, data processing environment 100 can offer infrastructure, platforms, software and/or services accessible to various client devices 110, such as personal (e.g., desktop, laptop, netbook, tablet or handheld) computers 110a, smart phones 110b, server computer systems 110c and consumer electronics, such as media players (e.g., set top boxes, digital versatile disk (DVD) players, or digital video recorders (DVRs)) 110d. It should be understood that the types of client devices 110 shown in FIG. 1 are illustrative only and that client devices 110 can be any type of electronic device capable of communicating with and/or accessing resources 102 via a packet network.

Figure 2:
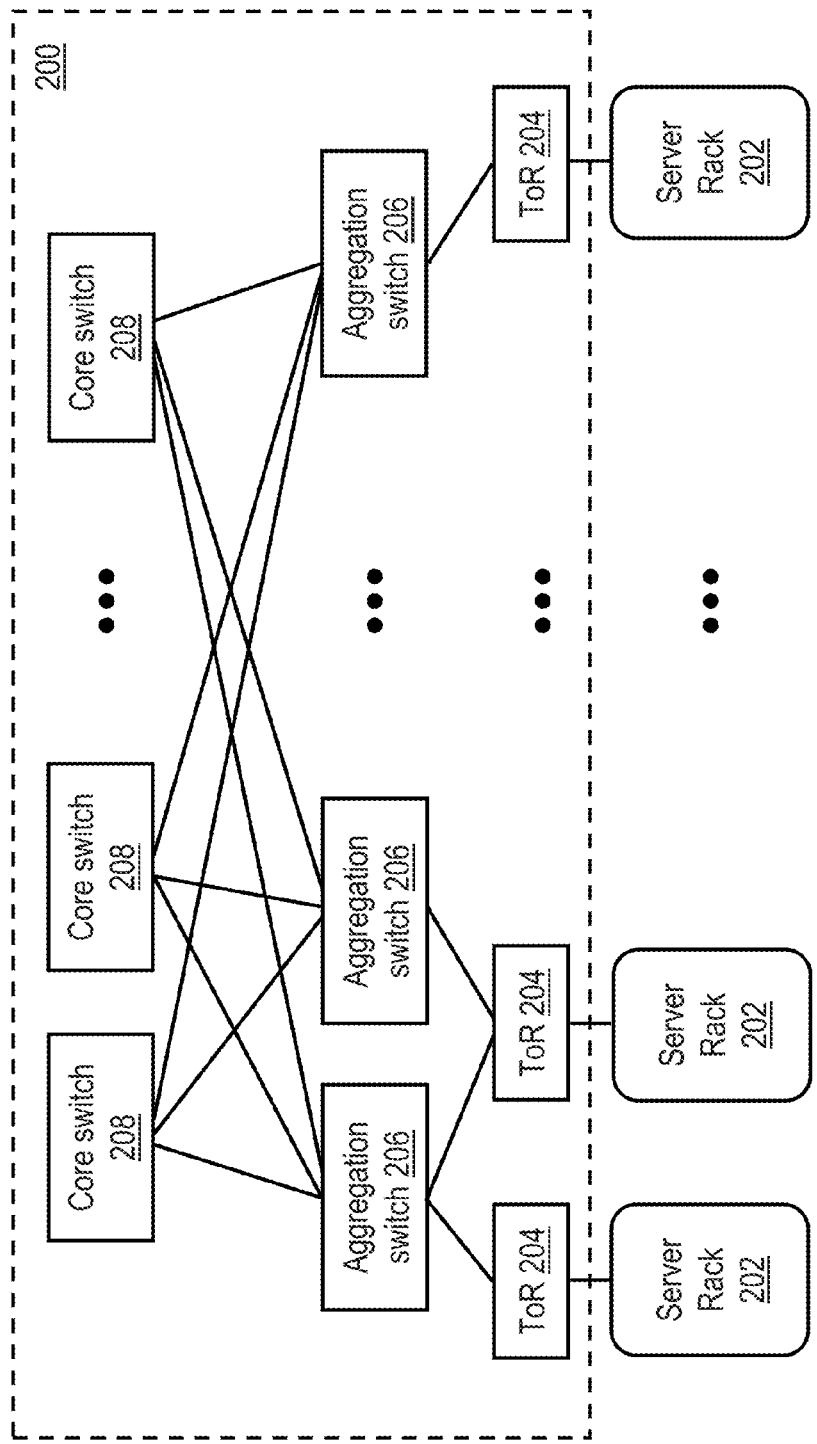
FIG. 2 is a more detailed view of a switching network in the data processing environment of FIG. 1.

Referring now to FIG. 2, there is illustrated a more detailed view of an exemplary embodiment of a switching network within resources 102 of data processing environment 100. In the depicted embodiment, resources 102 includes a plurality of server racks 202, which may form the computational resources of a data center, for example. Server racks 202 are coupled for communication by a Cloy switching network 200, which may be, for example, a Transparent Interconnection of Lots of Links (TRILL) network, Ethernet network, a converged network carrying Fibre Channel over Ethernet (FCoE), or some other packet switched network.

Switching network 200 has at a lowest tier a plurality of top-of-rack (ToR) switches 204 each mounted on a respective one of server racks 202. Switching network 200 additionally includes a middle tier of aggregation switches 206, each of which is coupled to, and aggregates data traffic of one or more ToRs 204. Switching network 200 finally includes at an upper tier a plurality of core switches 208. In the depicted embodiment, aggregation switches 206 and core switches 208 are coupled in a full mesh topology in which each core switch 208 is coupled to each of aggregation switches 206.

In a switching network 200 such as that illustrated, any of switches 204, 206 and 208 may become congested as one or more other switches of switching network 200 transmit data traffic at a rate greater than that switch 202 is itself able to forward that data traffic towards its destination(s). In many switching networks 200, congestion in some intermediate node (a switch 208 or 206) prevents data packets from being delivered to a final egress switch 204 even if there exists some alternate path to that egress switch 204. For example, a particular core switch 208 may become congested as multiple aggregation switches 206 concentrate egress data traffic at the same core switch 208, for example, due to multiple frequently referenced source-destination address tuples hashing to the same network path.

Figure 3:
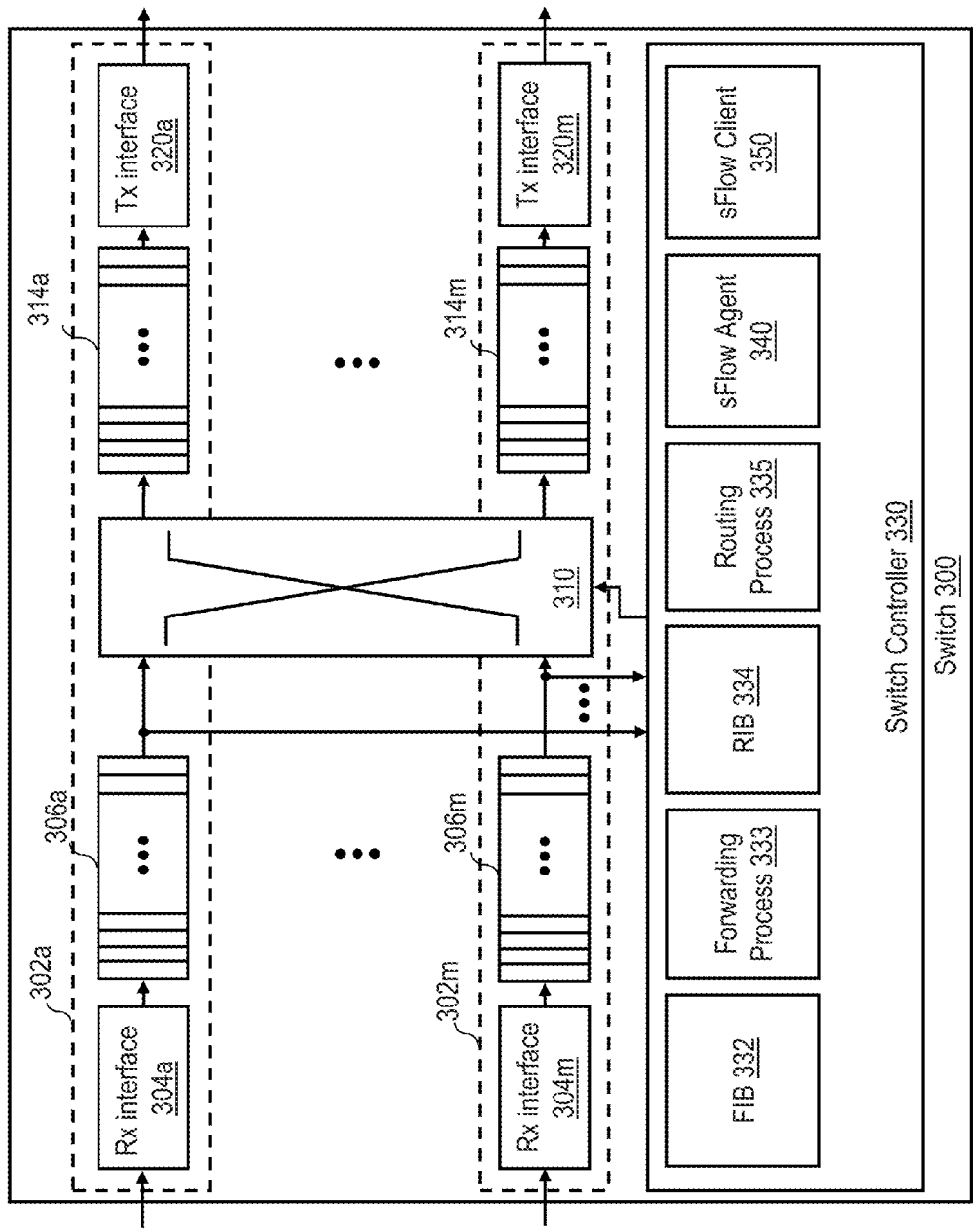
FIG. 3 illustrates an exemplary embodiment of a physical switch in a switching network.

With reference now to FIG. 3, there is illustrated a first exemplary embodiment of a physical switch 300 that may be utilized to implement any of switches of FIG. 2. As shown, switch 300 includes a plurality of physical ports 302a-302m, Each physical port 302 includes a respective one of a plurality of receive (Rx) interfaces 304a-304m and a respective one of a plurality of ingress queues 306a-306m that buffers frames of data traffic received by the associated Rx interface 304. Each of ports 302a-302m further includes a respective one of a plurality of egress queues 314a-314m and a respective one of a plurality of transmit (Tx) interfaces 320a-320m that transmit frames of data traffic from an associated egress queue 314.

Switch 300 additionally includes a switch fabric 310, such as a crossbar or shared memory switch fabric, which is operable to intelligently switch data frames from any of ingress queues 306a-306m to any of egress queues 314a-314m under the direction of switch controller 330. As will be appreciated, switch controller 330 can be implemented with one or more centralized or distributed, special-purpose or general-purpose processing elements or logic devices, which may implement control entirely in hardware, or more commonly, through the execution of firmware and/or software by a processing element.

In order to intelligently switch data frames, switch controller 330 builds and maintains one or more data plane data structures, for example, a Layer 2 forwarding information base (FIB) 332 and a Layer 3 routing information base (RIB) 334, which can be implemented, for example, as tables in content-addressable memory (CAM). In some embodiments, the contents of FIB 332 can be preconfigured, for example, by utilizing a management interface to specify particular egress ports 302 for particular traffic classifications (e.g., MAC addresses, traffic types, ingress ports, etc.) of traffic, Switch controller 330 can alternatively or additionally build FIB 332 in an automated manner by learning from observed data frames an association between ports 302 and destination MAC addresses specified by the data frames and recording the learned associations in FIB 332. A forwarding process 333 in switch controller 330 thereafter controls switch fabric 310 to switch data frames in accordance with the associations recorded in FIB 332. RIB 334, if present, can similarly be preconfigured or dynamically configured with routes associated with Layer 3 addresses, which are utilized by routing process 335 to route data packets. For example, in a embodiment in which switch 300 is a TRILL switch implemented in a TRILL network, RIB 334 is preferably preconfigured with a predetermined route through switching network 200 among multiple possible equal cost paths for each destination address. In other embodiments, dynamic routing algorithms, such as OSPF (Open Shortest Path First) or the like, can be utilized to dynamically select (and update RIB 334 with) a route for a flow of data traffic based on Layer 3 address and/or other criteria.

Switch controller 330 additionally includes an sFlow agent 340 that monitors operation of switch 300 in accordance with the snow protocol specifications promulgated by the sFlow.org consortium. In general, sFlow agent 340 captures a random sampling of (1 of N) packets transiting switch 300 and a time-based sampling of counters within interfaces 304 and 320. Sflow agent 340 reports the collected information to a central sFlow controller 500 (see, e.g., FIG. 5) in unreliable datagram protocol (UDP) packets. The sFlow controller analyzes and generates reports regarding network-wide data traffic across all or selected ones of the switches in switching network 200.

Switch controller 330 additionally includes an sFlow client 350 that, as discussed in greater detail below, receives sFlow information from the snow controller of switching network 200 and supplies the information to forwarding process 333 to optimize the distribution of data traffic in switching network 200.

Figure 4:
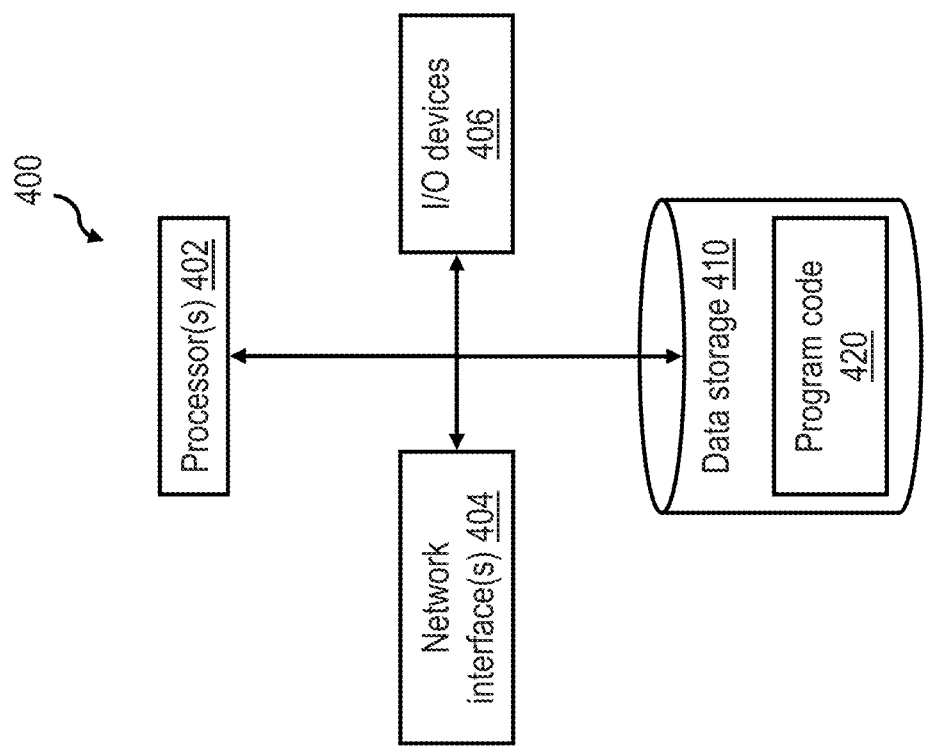
FIG. 4 depicts an exemplary embodiment of a host platform that can be utilized to implement a virtual switch of a switching network.

As noted above, any of switches 300 may be implemented as a virtual switch by program code executed on a physical host platform. For example, FIG. 4 depicts an exemplary host platform 400 including one or more network interfaces 404 (e.g., network interface cards (NICs), converged network adapters (CNAs), etc.) that support connections to physical network links for communication with other switches 202 or other network-connected devices. Host platform 400 additionally includes one or more processors 402 (typically comprising one or more integrated circuits) that process data and program code, for example, to manage, access and manipulate data or software in data processing environment 100. Host platform 400 also includes input/output (I/O) devices 406, such as ports, displays, user input devices and attached devices, etc., which receive inputs and provide outputs of the processing performed by host 400 and/or other resource(s) in data processing environment 100. Finally, host platform 400 includes data storage 410, which may include one or more volatile or non-volatile storage devices, including memories, solid state drives, optical or magnetic disk drives, tape drives, etc. Data storage 410 may store, for example, program code 420 (including software, firmware or a combination thereof) executable by processors 402. Program code 420, which may comprise one or more of a virtual machine monitor (VMM), virtual machines, operating system(s) (OSs), and/or application software, may implement one or more switches 204, 206 or 208 (and one or more associated network links) virtually. As understood by those skilled in the art, such virtual switches may virtualize the components and functions of switch 300 of FIG. 3, including that of switch controller 330. Further, such switches can be configured to support any of a number of protocols, including TRILL, Fibre Channel, Ethernet, FCoE, etc.

Figure 5:
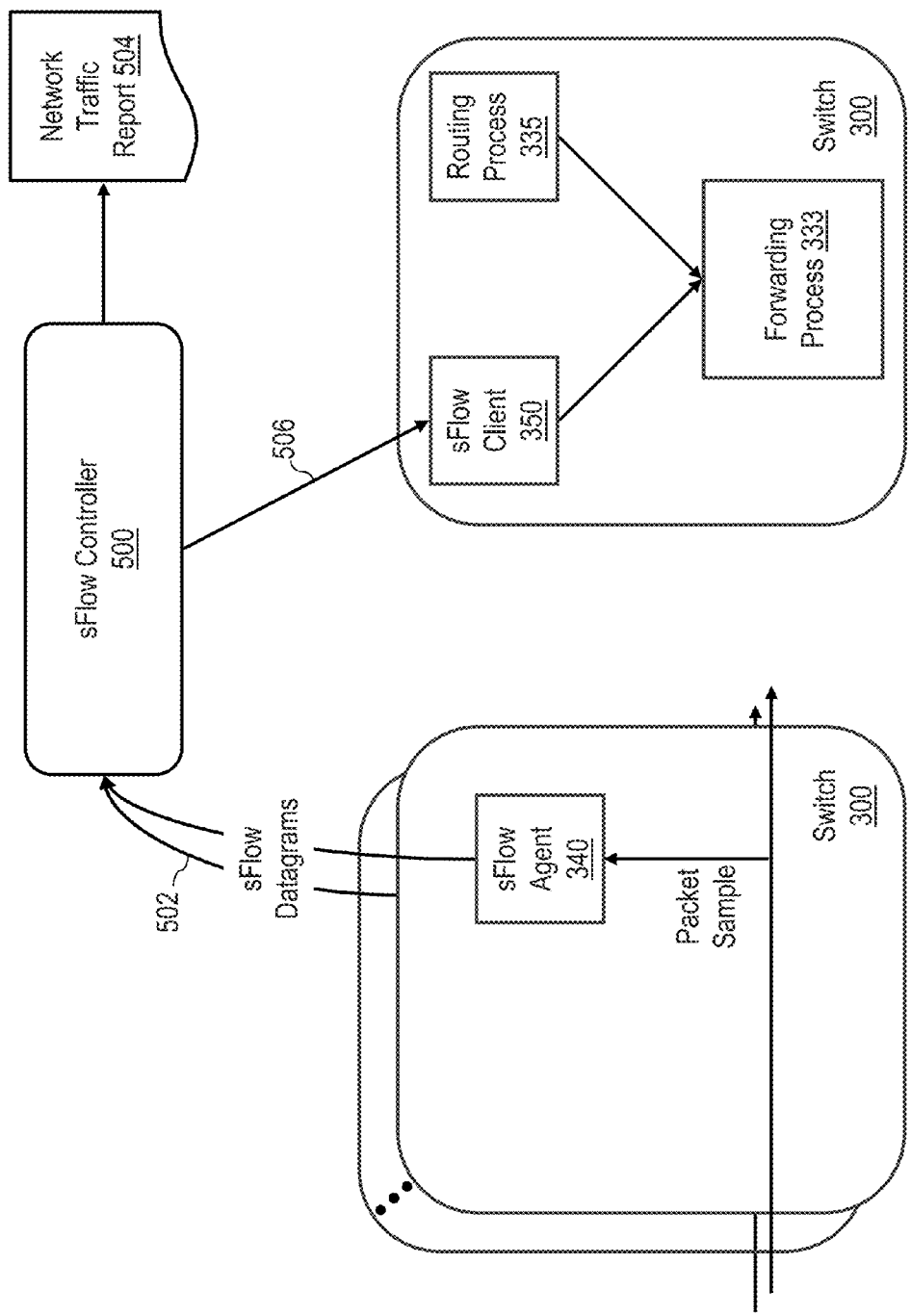
FIG. 5 depicts the flow of traffic management information in an exemplary switching network.

With reference now to FIG. 5, there is illustrated a exemplary data flow diagram of traffic management information in an exemplary switching network, such as switching network 200 of FIG. 2. As shown, in the exemplary data flow, the sFlow agent 340 in each of a plurality of switches 300 of switching network 200 captures packet samples from the data traffic transiting its associated switch 300 and communicates the captured packet samples and interface counter values in UDP sFlow datagrams 502 to a central sFlow controller 500. SFlow controller 500, which may execute, for example, on server 110c of FIG. 1 or one of server racks 202, collects and analyzes the network traffic information in sFlow datagrams 502 to generate a network traffic report 504 that digests the types and distribution of network traffic in switching network 200, permitting performance optimization, accounting and billing for network usage, and detection and response to security threats. As will be appreciated, network traffic report 504 may be recorded in data storage (e.g., in a log) and may further be presented in a human-viewable (e.g., graphical, textual, tabular and/or numeric) format.

In accordance with the present disclosure, the capabilities of sFlow controller 500 are extended to include the distribution of relevant topological congestion information 506 to one or more (and possibly all of) switches 300 in switching network 200. Topological congestion information 506, which identifies one or more forwarding paths of the recipient switch 300 that are experiencing higher congestion relative to other forwarding paths of the receiving switch 300, is received by the sFlow client 350 of the recipient switch 300, which in turn informs forwarding process 333 of the recipient switch 300. In response, forwarding process 333 of the recipient switch 300 selects a forwarding path for its data traffic among multiple equal cost paths (i.e., ECMP paths) based on available path information from the routing process 335 and the topological congestion information provided by sFlow client 350. Forwarding process 350 may further update FIB 332 with an entry associating the selected forwarding path and the Layer 2 destination address of the data traffic.

Figure 6:
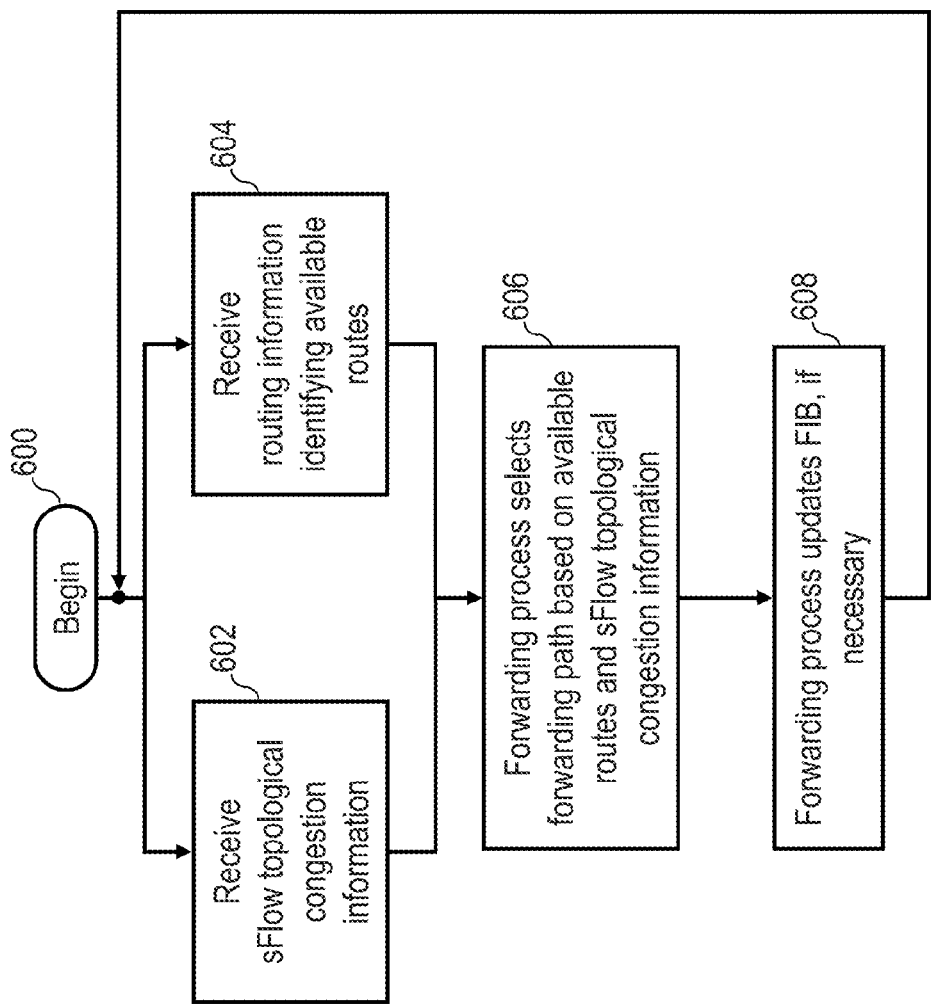
FIG. 6 is a high level logical flowchart of an exemplary embodiment of a process by which topological congestion information is employed to achieve improved traffic distribution in a switching network.

Referring now to FIG. 6, there is illustrated a high level logical flowchart of an exemplary embodiment of a process by which a congestion information is employed to achieve improved traffic distribution in a switching network. As a logical rather than strictly chronological flowchart, at least some of the illustrated steps can be performed in a different order than illustrated or concurrently. The illustrated process can be implemented, for example, by a forwarding process 333 of the switch controller 330 of a switch 300 in switching network 200.

The process begins at block 600 and then proceeds to block 602 and 604, which illustrate forwarding process 333 asynchronously receiving sFlow topological congestion information (e.g., from sFlow client 350) and routing information (e.g., from routing process 335). Forwarding process 333 then selects a forwarding path for its data traffic from among multiple network paths based upon the available paths indicated by the routing information and the sFlow topological congestion information (block 606). At block 606, forwarding process 333 preferably selects the forwarding path in order to reduce network congestion along the forwarding path(s) indicated by the sFlow topological congestion information provided by snow controller 500 and sFlow client 350. If needed, forwarding process 333 updates FIB 332 with an entry associating the selected forwarding path and the Layer 2 destination address of the data traffic (block 608). Thereafter the process returns to block 602 and 604, which have been described.

As has been described, in at least one embodiment a switch for a switching network includes a plurality of ports for communicating data traffic and a switch controller that controls switching between the plurality of ports. The switch controller selects a forwarding path for the data traffic based on at least topological congestion information for the switching network. In a preferred embodiment, the topological congestion information includes sFlow topological congestion information and the switch controller includes an sFlow client that receives the sFlow topological congestion information from an sFlow controller in the switching network.

While the present invention has been particularly shown as described with reference to one or more preferred embodiments, it will be understood by those skilled in the art that various changes in form and detail may be made therein without departing from the spirit and scope of the invention. For example, although aspects have been described with respect to one or more machines (e.g., hosts and/or network switches) executing program code (e.g., software, firmware or a combination thereof) that direct the functions described herein, it should be understood that embodiments may alternatively be implemented as a program product including a tangible machine-readable storage medium or storage device (e.g., an optical storage medium, memory storage medium, disk storage medium, etc.) storing program code that can be processed by a machine to cause the machine to perform one or more of the described functions.

What is claimed is:

1. A switch for a switching network, wherein the switch comprises:
   a physical platform, including:
      a plurality of ports for communicating data traffic;
      data storage including a Layer 2 forwarding information base; and
      a switch controller that controls switching of data traffic between the plurality of ports of the switch by reference to the Layer 2 forwarding information base, wherein the switch controller includes an sFlow client and is configured such that:
         the sFlow client of the switch controller receives sFlow topological congestion information from an sFlow controller in the switching network, wherein the topological congestion information is generated by the sFlow controller based on sFlow datagrams received from multiple switches coupled to different network links of the switching network and identifies one or more forwarding paths of the switch that are experiencing higher congestion relative to other forwarding paths of the recipient switch;

the switch controller selects a Layer 2 forwarding path for the data traffic from among multiple forwarding paths then available and reachable from the switch based on at least the received topological congestion information; and the switch controller updates the Layer 2 forwarding information base based on the selected forwarding path and an Layer 2 destination address for the data traffic.

2. The switch of claim 1, wherein the switch controller further selects the forwarding path based on available routes indicated by a routing process of the switch.

3. A switching network comprising:

a plurality of interconnected switches including the switch of claim 1; and the sFlow controller, wherein the sFlow controller is coupled to receive sFlow datagrams from the plurality of switches and to provide the topological congestion information to the switch.

4. The switch of claim 1, wherein the switch further includes an sFlow agent that transmits sFlow datagrams to the sFlow controller.

5. The switch of claim 2, wherein:

the data storage further includes a Layer 3 routing information base that associates a respective predetermined route through the switching network for each of multiple Layer 3 destination addresses; and the routing process determines the available routes by reference to the Layer 3 routing information base.

6. The switch of claim 2, wherein the routing process determines the available routes utilizing dynamic routing.

7. The switching network of claim 3, wherein the switching network comprises a Clos switching network.

8. A program product, comprising:

a machine-readable storage device; and program code stored within the machine-readable storage device, wherein the program code, when processed by a machine, causes the machine to perform:

receiving data traffic at a switch;

receiving topological congestion information from an sFlow controller in a switching network including the switch, wherein the topological congestion information is generated by the sFlow controller based on sFlow datagrams received from multiple switches coupled to different network links of the switching network and identifies one or more forwarding paths of the switch that are experiencing higher congestion relative to other forwarding paths of the recipient switch;

the switch selecting a Layer 2 forwarding path for the data traffic among multiple possible forwarding paths reachable from the switch based on at least the sFlow topological congestion information for the switching network;

the switch updating a Layer 2 forwarding information base based on the selected forwarding path and an Layer 2 destination address for the data traffic; and the switch switching data traffic between a plurality of ports of the switch by reference to the Layer 2 forwarding information base.

9. The program product of claim 8, wherein selecting the forwarding path comprises selecting the forwarding path based on the topological congestion information and available routes indicated by a routing process of the switch.

10. The program product of claim 8, wherein the program code further causes the switch to transmit sFlow datagrams to the sFlow controller.

11. The program product of claim 9, wherein:

the program code further causes the switch to maintain a Layer 3 routing information base that associates a respective predetermined route through the switching network for each of multiple Layer 3 destination addresses; and the program code causes the routing process to determine the available routes by reference to the Layer 3 routing information base.

12. The program product of claim 9, wherein the program code further causes the routing process of the switch to determine the available routes utilizing dynamic routing.

* * * * *